(12) United States Patent
Zhu et al.

(10) Patent No.: US 10,832,623 B2
(45) Date of Patent: Nov. 10, 2020

(54) DISPLAY PANEL AND DISPLAY METHOD

(71) Applicant: Xianyang Caihong Optoelectronics Technology Co.,Ltd, Xianyang (CN)

(72) Inventors: Huanhuan Zhu, Xianyang (CN); Yuan-Liang Wu, Xianyang (CN); Yuyeh Chen, Xianyang (CN); Yusheng Huang, Xianyang (CN); Zihan Liu, Xianyang (CN)

(73) Assignee: XIANYANG CAIHONG OPTOELECTRONICS TECHNOLOGY CO., LTD., Xianyang (CN)

( * ) Notice: Subject to any disclaimer, the term of this patent is extended or adjusted under 35 U.S.C. 154(b) by 4 days.

(21) Appl. No.: 16/430,525

(22) Filed: Jun. 4, 2019

(65) Prior Publication Data
US 2020/0152141 A1    May 14, 2020

(30) Foreign Application Priority Data

Nov. 13, 2018 (CN) .......................... 2018 1 1347784
Nov. 13, 2018 (CN) .......................... 2018 1 1347789

(51) Int. Cl.
*G09G 3/36* (2006.01)
*G06F 3/0354* (2013.01)

(52) U.S. Cl.
CPC ......... *G09G 3/3607* (2013.01); *G09G 3/3677* (2013.01); *G09G 3/3688* (2013.01); *G06F 3/03542* (2013.01); *G09G 2320/0666* (2013.01); *G09G 2320/0686* (2013.01);
(Continued)

(58) Field of Classification Search
CPC .. G09G 3/3607; G09G 3/3677; G09G 3/3688; G09G 2320/0666; G09G 2320/0686; G09G 2354/00; G09G 2360/141; G09G 2360/14; G06F 3/03542
See application file for complete search history.

(56) References Cited

U.S. PATENT DOCUMENTS

| | | | | |
|---|---|---|---|---|
| 2009/0073107 A1* | 3/2009 | Chen | ......................... | G09G 3/36 345/102 |
| 2009/0237332 A1* | 9/2009 | Choi | ...................... | G09G 3/325 345/76 |

(Continued)

*Primary Examiner* — Kent W Chang
*Assistant Examiner* — Andrew Lee
(74) *Attorney, Agent, or Firm* — WPAT, PC

(57) ABSTRACT

The invention provides a display panel, including a color filter substrate and a thin film transistor array substrate disposed oppositely, and a liquid crystal layer filled between the color filter substrate and the thin film transistor array substrate, wherein the thin film transistor array substrate includes a display area, a non-display area, and a plurality of photo sensors are disposed in the display area; the color filter substrate is formed with a plurality of light transmissive passages; the thin film transistor array substrate is disposed with a plurality of sub-pixels; and the photo sensor is configured for detecting position information corresponding to an external photoelectric signal when receiving the external photoelectric signal. The display panel is provided with a plurality of photo sensors, when the incident laser light is irradiated onto the photo sensor, the photo sensor can be triggered to work, and the laser projection position is determined.

17 Claims, 6 Drawing Sheets

(52) U.S. Cl.
CPC ... *G09G 2354/00* (2013.01); *G09G 2360/141* (2013.01); *G09G 2360/144* (2013.01)

(56) References Cited

U.S. PATENT DOCUMENTS

| | | | |
|---|---|---|---|
| 2013/0027356 A1* | 1/2013 | Nishida | G06F 3/0412 |
| | | | 345/175 |
| 2013/0076721 A1* | 3/2013 | Al-Dahle | G09G 3/3655 |
| | | | 345/212 |
| 2017/0277356 A1* | 9/2017 | Hsieh | G06F 3/042 |
| 2018/0108287 A1* | 4/2018 | Jiang | G09G 3/2074 |
| 2018/0203537 A1* | 7/2018 | Kim | G06F 3/042 |
| 2019/0213955 A1* | 7/2019 | Chen | G09G 3/2003 |
| 2020/0051499 A1* | 2/2020 | Chung | G09G 3/3275 |

* cited by examiner

DISPLAY PANEL AND DISPLAY METHOD

FIELD OF THE DISCLOSURE

The present invention relates to the field of display technologies, and in particular, to a display panel and a display method.

BACKGROUND OF THE DISCLOSURE

The laser pointer, also known as the laser pointer, is a pen-type transmitter that is designed to be portable, hand-friendly, and processed by a laser module (light-emitting diode). It has been widely used in e-learning, presentations, and presentations.

In some application scenarios, liquid crystal display panels such as LEDs and OLEDs need to be used in conjunction with a laser pointer for better presentation. When the laser pointer is projected onto the display surface of the display panel, part of the incident light is absorbed, and on the other hand, due to the high brightness of the display panel itself. It will cause the viewer and the user to see the highlights of the laser pen projected onto the display panel, and even see the bright spots, which seriously affects the presentation effect.

In view of this, it is necessary to design a display panel that can be used with a laser pointer to achieve a good demonstration effect.

SUMMARY OF THE DISCLOSURE

In order to solve the above problems in the prior art, the present invention provides a display panel and a display method. The technical problem to be solved by the present invention is achieved by the following technical solutions.

The present invention provides a display panel including a color filter substrate and a thin film transistor array substrate disposed oppositely, and a liquid crystal layer filled between the color filter substrate and the thin film transistor array substrate. The thin film transistor array substrate includes a display area, a non-display area, and a plurality of photo sensors are disposed in the display area. The color filter substrate is formed with a plurality of light transmissive passages. The thin film transistor array substrate is disposed with a plurality of sub-pixels. The photo sensor is configured for detecting position information corresponding to an external photoelectric signal when receiving the external photoelectric signal.

In an embodiment of the invention, the number of the light transmissive passages is equal to the number of the photo sensors, and each of the photo sensors has one of the light transmissive passages disposed there above.

In an embodiment of the invention, the thin film transistor array substrate is disposed with a plurality of scan lines, a plurality of data lines, and a plurality of common voltage lines. The number of the plurality of scan lines and the number of the plurality of common voltage lines are equal, the plurality of scan lines are arranged in parallel and alternately with the plurality of common voltage lines.

In an embodiment of the invention, the photo sensor is a TFT element, a gate and a drain of the TFT element are connected to the scan line, and a source of the TFT element is connected to the data line.

In an embodiment of the invention, the sub-pixel is located in a region where the scan line and the data line intersect perpendicularly.

In an embodiment of the invention, each of the sub-pixels together with the scan line, the data line and the common voltage line form a pixel unit. Each the pixel unit is disposed with one of the photo sensors.

In an embodiment of the invention, the display panel further includes a scan driver and a data driver, the scan lines and the common voltages line are both connected to the scan driver, and the data lines are connected to the data driver.

In an embodiment of the invention, the scan driver is disposed with a first current detecting module, and the first current detecting module is connected to the photo sensors through the scan lines and configured for detecting current changes in the photo sensors along a scan line direction.

In an embodiment of the invention, the data driver is disposed with a second current detecting module, and the second current detecting module is connected to the photo sensors through the data lines and configured for detecting current changes in the photo sensors along a data line direction.

In an embodiment of the invention, the non-display area has a plurality of control switches disposed therein, the control switches are configured to stop loading a common voltage to the sub-pixels in a preset period. The plurality of light transmissive passages are located at positions vertically corresponding to the plurality of photo sensors on the color filter substrate.

In an embodiment of the invention, the thin film transistor array substrate is provided with a plurality of scan lines, a plurality of data lines, a first common voltage line, a control signal line, and a plurality of second common voltage lines, wherein the number of the plurality of scan lines and the number of the plurality of common voltage lines are equal, the plurality of scan lines are arranged in parallel and alternately with the plurality of common voltage lines. The control signal line is connected to the control switch configured to control the turning on and off of the control switch.

In an embodiment of the invention, the control switch is a TFT element having a gate connected to the control signal line, a source connected to the first common voltage line, and a drain connected to the second common voltage line.

In an embodiment of the invention, on the thin film transistor array substrate, the photo sensor is located in a region where the scan line and the data line intersect perpendicularly.

In an embodiment of the invention, the photo sensor is a TFT element, a gate and a drain of the TFT element are connected to the second common voltage line and a source of the TFT element is connected to the data line.

In an embodiment of the invention, each of the sub-pixels together with the scan line, the data line and the second common voltage line form a pixel unit; each the pixel unit is disposed with one of the photo sensors.

In an embodiment of the invention, the display panel further includes a first current detecting module and a second current detecting module. The first current detecting module is connected to the photo sensors through second common voltage lines configured for detecting current changes in the photo sensors along a scan line direction. The second current detecting module is connected to the photo sensors through the data lines configured for detecting current changes in the photo sensors along a data line direction.

In addition, a display method is provided in the embodiment of the present invention, including: S1, stopping loading a common voltage to sub-pixels in a preset period; S2, detecting position information of an external photoelectric signal irradiated onto a designated area of the display panel at the preset period; S3, adjusting a display brightness or a display color of the sub-pixel in the designated area according to the position information.

In an embodiment of the invention, the preset period is a period in which a scan signal and a data signal are both at low levels.

In an embodiment of the invention, the step S2 includes: S21, receiving the external photoelectric signal and generating a feedback signal by a photo sensor located in the designated area; and S22, determining the position information corresponding to the external photoelectric signal according to the feedback signal.

In an embodiment of the invention, the step S3 includes: determining whether a gray scale of the sub-pixel in the designated area is smaller than a preset gray scale, if yes, increasing the gray scale of the sub-pixel of the designated area and a gray scale of a neighboring sub-pixel so as to improve display brightness of the designated area; if not, reducing the gray scale of the sub-pixel of the designated area and a gray scale of a neighboring sub-pixel so as to reduce the display brightness of the designated area.

Compared with the prior art, the embodiment of the present invention can achieve one or more of the following beneficial effects:

1. The display panel of the embodiment of the present invention has a plurality of photo sensors disposed on the thin film transistor array substrate, when the incident laser is irradiated onto the photo sensor, the photo sensor can be triggered to work to determine the laser projection position to change the gray scale of the sub-pixel of the laser irradiation region, thereby improving the demonstration effect.

2. The display panel of the embodiment of the invention performs the photoelectric signal position test between the frame and the frame, that is, when the scanning signal and the control signal are both at low levels, which can well determine the laser projection position and ensure the normal display effect.

3. The display panel of the embodiment of the present invention has a plurality of photo sensors and a plurality of control switches disposed on the thin film transistor array substrate. When the incident laser is irradiated onto the photo sensor, the photo sensor and the control switch can be triggered to change the gray scale of the sub-pixel of the laser irradiation area, thereby determining the laser projection position and improving the demonstration effect.

4. The display method of the embodiment of the invention performs the photoelectric signal position test between the frame and the frame, that is, when the scan signal and the control signal are both at low levels, which can well determine the laser projection position, improve the demonstration effect, and at the same time ensure the normal display effect.

The above description is merely an overview of the technical solutions of the present invention, and can be implemented in accordance with the contents of the specification in order to more clearly understand the technical means of the present invention. The above and other objects, features, and advantages of the present invention will become more apparent and understood.

DETAILED DESCRIPTION OF PREFERRED EMBODIMENTS

The display panel and the display device according to the present invention will be described in detail below in conjunction with the accompanying drawings and specific embodiments in order to further illustrate the technical means and function of the present invention for achieving the intended purpose of the invention.

The above and other technical contents, features, and advantages of the present invention will be apparent from the following detailed description of the embodiments. Through the description of the specific embodiments, the technical means and effects of the present invention for achieving the intended purpose can be further and specifically understood. The accompanying drawings are only for the purpose of illustration and description, and are not intended to limit the invention.

Embodiment 1

Figure 1:
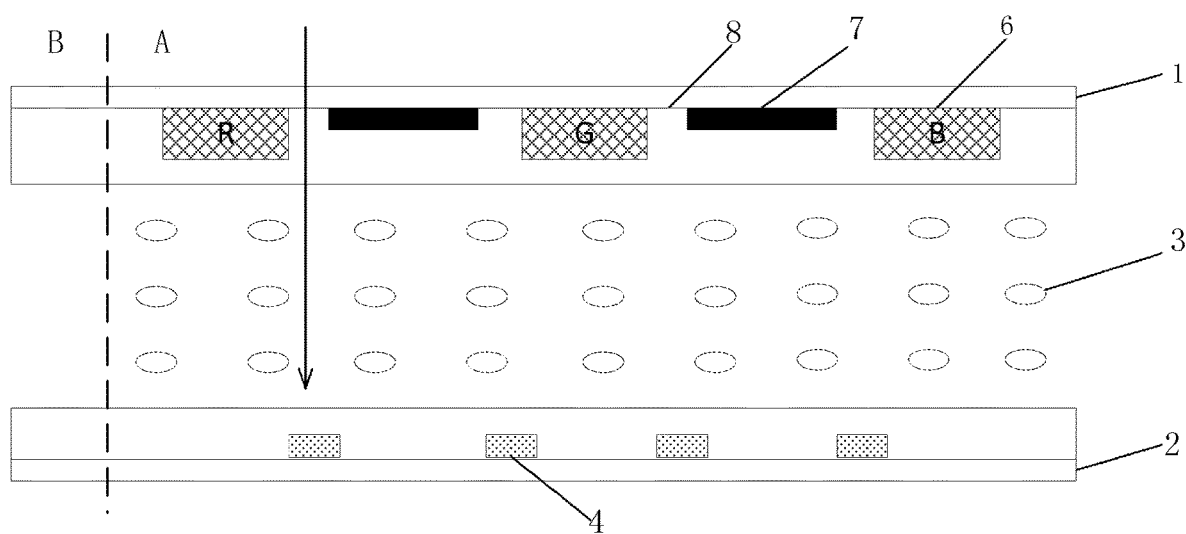
FIG. 1 is a schematic structural diagram of a display panel according to Embodiment 1 of the present invention.

Referring to FIG. 1, FIG. 1 is a schematic structural diagram of a display panel according to an embodiment of the present invention. As shown in FIG. 1, the display panel of the embodiment can recognize external light, and includes a color filter substrate 1 and a thin film transistor array substrate 2 disposed opposite to each other, and a liquid crystal layer 3 filled between the color filter substrate 1 and the thin film transistor array substrate 2.

Further, the color filter substrate 1 includes the color filter 6 and the black matrix 7 which are arranged in phase. The light transmissive passages 8 may be formed in the color filter 6, the black matrix 7, and the color filter substrate 1 between the color filter 6 and the black matrix 7. As shown in FIG. 1, in this embodiment, the light transmissive passage 8 is formed on the color filter substrate 1 between the color filter 6 and the black matrix 7, and the photo sensor 4 is located on the thin film transistor array substrate 2 below the light transmissive passage 8. When the display panel is irradiated with laser light from the outside (as indicated by an arrow in FIG. 1), the laser light can be smoothly irradiated onto the photo sensor 4 through the light transmitting hole 8, thereby triggering a change in current on the photo sensor 4.

Figure 2:
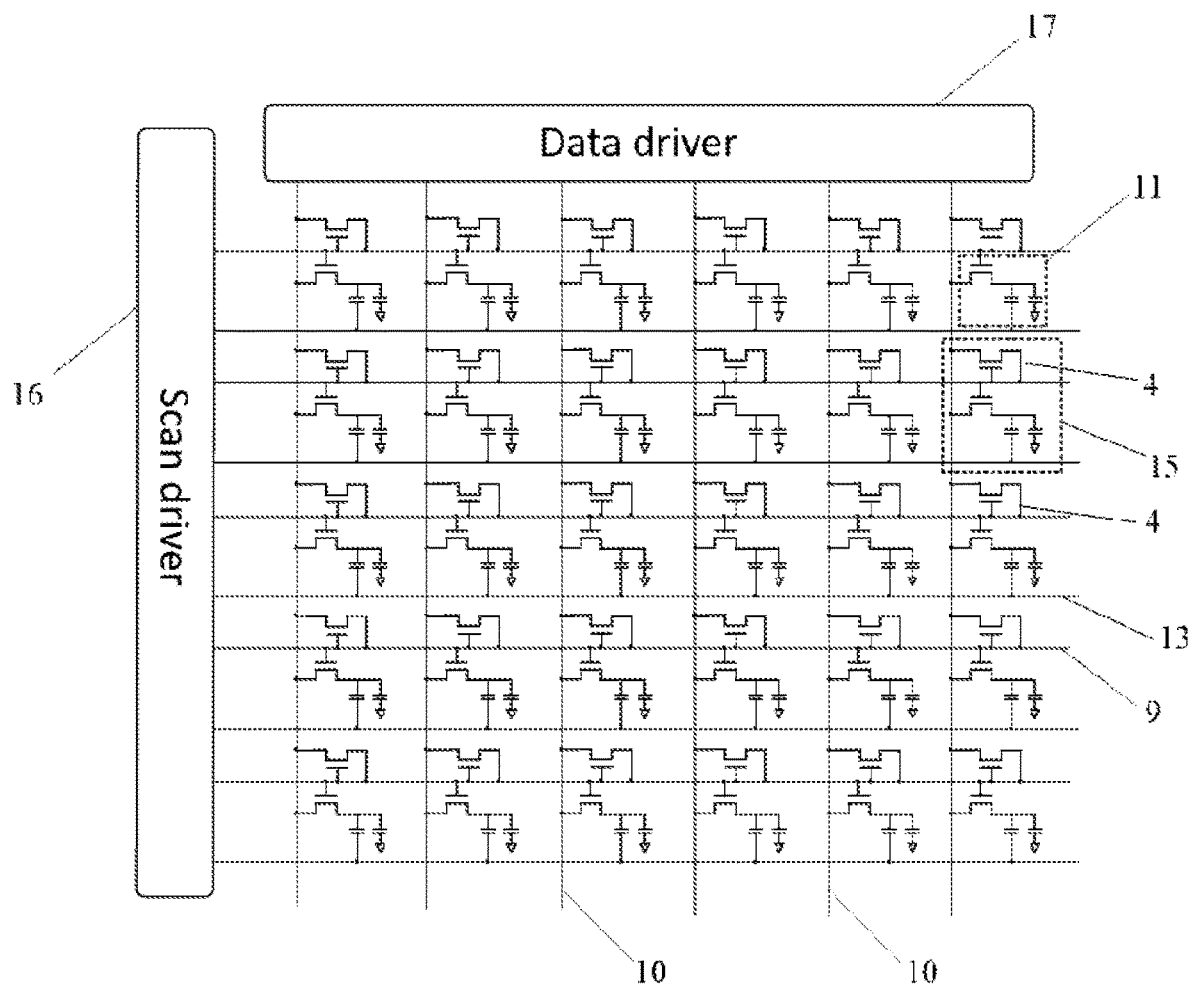
FIG. 2 is a structural diagram of an equivalent circuit of a display panel according to Embodiment 1 of the present invention.

Referring to FIG. 2, FIG. 2 is a structural diagram of an equivalent circuit of a display panel according to an embodiment of the present invention. As shown in FIG. 2, the thin film transistor array substrate 2 is provided with a plurality of scan lines 9 parallel to each other, a plurality of common voltage lines 13 parallel to the scan lines 9, a plurality of data lines 10 parallel to each other and perpendicularly insulated from the scan lines 9, and a plurality of sub-pixels 11 located at a region where the scan line 9 and the data line 10 intersect perpendicularly. The plurality of sub-pixels 11 are all located in the display area A. In this embodiment, the plurality of scan lines 9 and the plurality of common voltage lines 13 are equal in number and arranged in parallel.

With continued reference to FIG. 2, the sub-pixel 11 is located in a region where the scan line 9 and the data line 10 intersect perpendicularly. The data line 10 is configured to load a data driving signal onto the sub-pixel 11. The data driving signal controls the sub-pixel 11 to display colors of different gray scales according to the magnitude of the driving voltage. The scan line 9 is configured load a scan driving signal to the sub-pixel 11, and the scan driving signal controls whether or not the data driving signal is loaded onto the sub-pixel 11. In a specific embodiment, the data line 10, the scan line 9 and the common voltage line 13 are generally made of a conductive material, and specifically may be a metal element, an alloy, a metal oxide, a metal nitride, a metal oxynitride or a combination of two or more of the above materials.

In the present embodiment, the photo sensor 4 is a TFT element whose gate and drain are connected to the scan line 9, and the source is connected to the data line 10.

Each of the sub-pixels 11 together with the scan line 9, the data line 10 and the common voltage line 13 form a pixel unit 15, wherein each of the pixel units 15 is provided with a photo sensor 4.

Figure 4:
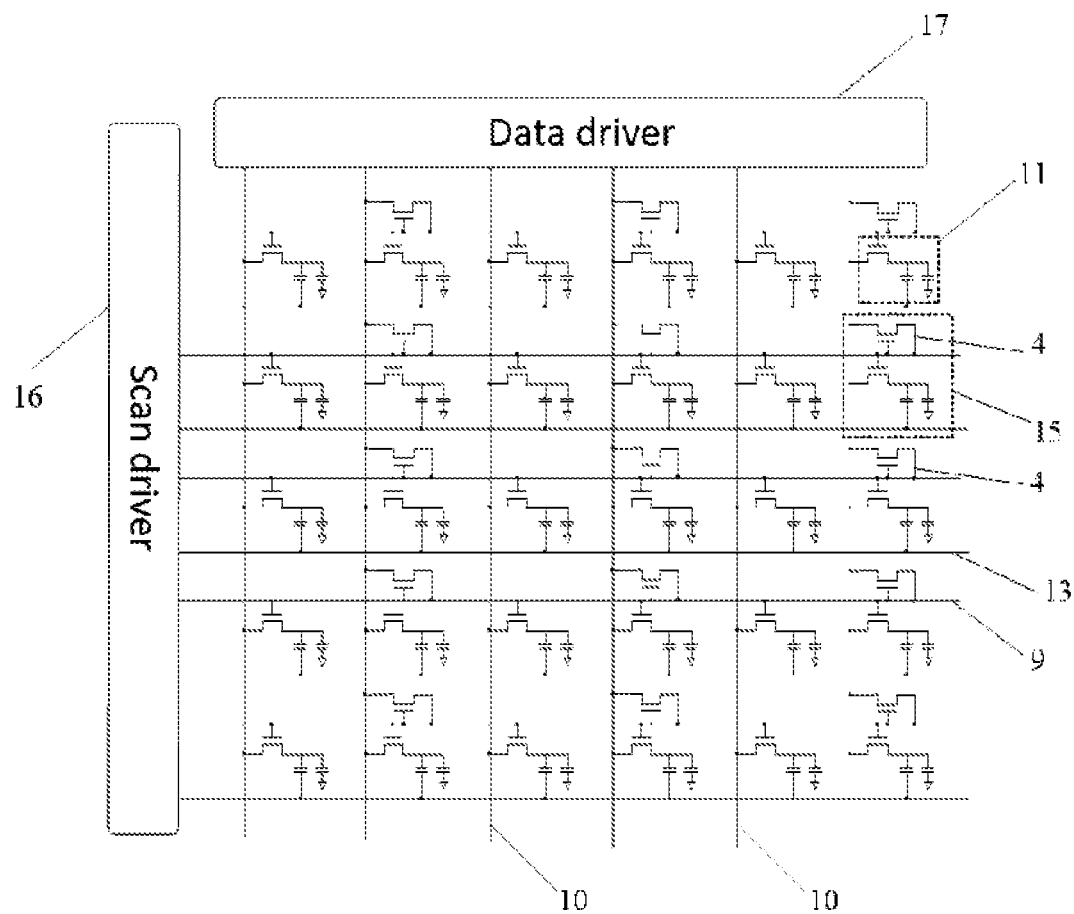
FIG. 4 is a schematic structural diagram of another display panel according to Embodiment 1 of the present invention.

However, it should be noted that in other embodiments, the photo sensors 4 may have other arrangements, and the photo sensors 4 may be set according to actual needs. Referring to FIG. 4, FIG. 4 is a schematic structural diagram of another display panel according to an embodiment of the present invention. In the display panel, not only one photo sensor 4 is connected to each of the sub-pixels 11, but the photo sensors 4 are provided on the sub-pixel 11 of the interleave column. In other embodiments, the display panel may be divided into a plurality of unit regions according to the diameter of the aperture of the incident light irradiated onto the panel, and one photo sensor 4 may be disposed on each of the unit regions or a plurality of photo sensors 4 may be uniformly disposed to increase the pixel aperture ratio.

Further, the display panel further includes a scan driver 16 and a data driver 17, wherein the scan lines 9 and the common voltage lines 13 are connected to the scan driver 16, and the data lines 10 are connected to the data driver 17. The scan line 9 is configured to supply a scan voltage to the sub-pixel 11, and the data line 10 is configured to supply a data voltage to the sub-pixel 11. The common voltage line 13 is specifically connected to a common voltage generating circuit (not shown) integrated in the scan driver 16 configured to supply a common voltage to the sub-pixel 11.

In addition, in the embodiment, the scan driver 16 is provided with a first current detecting module (not shown), the first current detecting module is connected to the photo sensors 4 through the scan lines 9 configured for detecting changes in current in the photo sensors 4 along the scan line direction, thereby detecting the position of the laser irradiation outside the scan line direction. A second current detecting module (not shown) is disposed on the data driver 17, the second current detecting module is connected to the photo sensors 4 through the data lines 10 configured for detecting current changes in the photo sensor 4 along the data line direction, thereby detecting the position of the laser irradiation outside the data line direction.

In addition, in this embodiment, the display panel further includes a control module (not shown), the control module can be disposed on the scan driver 16 and the data driver 17, or connected to the scan driver 16 and the data driver 17, configured to send control signals to the scan driver 16 and the data driver 17 to control the normal display time of each frame and the laser detection time between frames.

During use of the display panel, when the display panel is in the normal display mode, the common voltage generated by the common voltage generating circuit is transmitted from the common voltage line 13 to the respective sub-pixels 11, so that the sub-pixel 11 is normally displayed. At this time, if the laser light from the external laser pen is irradiated to one of the photo sensors 4 through the light transmissive passage 8, due to the action of the laser, the intensity of the current flowing through the photo sensor 4 increases, and the detection circuit starts to work during the non-display time between the frame and the frame, that is, during the laser detection time. At this time, the first current detecting module detects a change in current on the scan line 9, and the second current detecting module detects a change in current on the data line 10, determining the position of the laser irradiation according to the current change on the scan line 9 and the current change on the data line 10, and feeding back the position information to the control module, the control module sends a display control signal to the sub-pixel 11 so that the brightness of the sub-pixel 11 and the adjacent sub-pixels therein changes. For example, it becomes brighter or darker to make a difference in display with adjacent sub-pixels, so that the user can observe the position of the laser and complete the laser positioning action.

In this embodiment, the display change process of the sub-pixels of the laser irradiation area is: determining whether the gray scale of the sub-pixel of the laser irradiation area is smaller than a preset gray scale value; if yes, increasing the gray scale of the detection sub-pixel and its neighboring sub-pixels or pixels in the small area to improve the display brightness of the detection area to form a contrast between light and dark, for example, the specified area sub-pixel and its adjacent sub-pixels display a gray scale 255, that is, a white point appears here; if not, reducing the gray scale displayed by the pixels in the preset area sub-pixel and its adjacent sub-pixels or small areas to reduce the display brightness of the preset area to form a contrast between light and dark, for example, the specified area sub-pixel and its adjacent sub-pixels display gray scale 0, that is, a black dot appears here, so that the difference from other areas is displayed from the brightness, so that the position of the laser irradiation is more easily found by the human eye.

Figure 3:
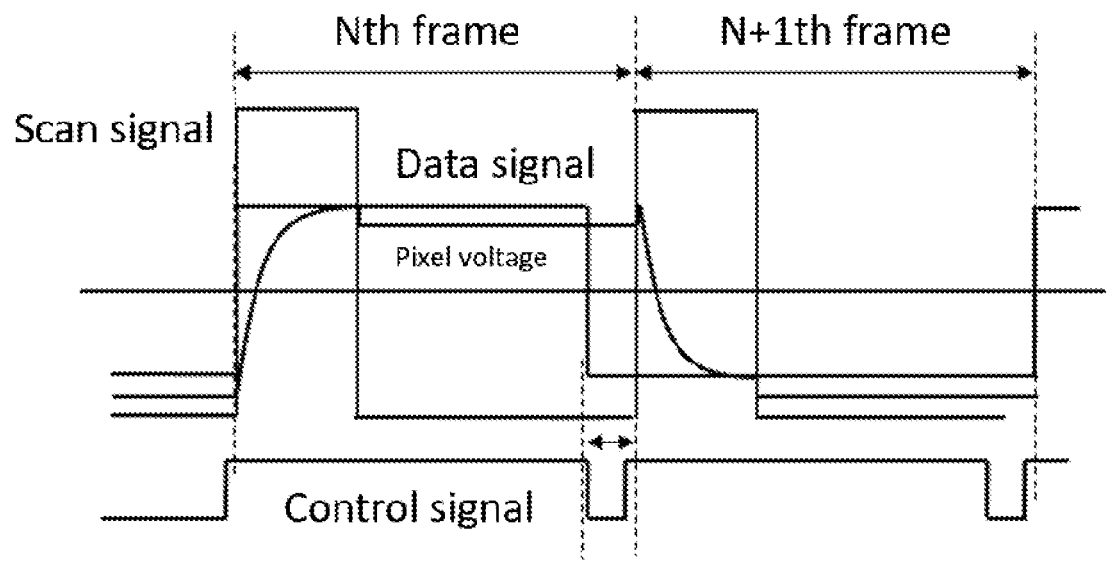
FIG. 3 is a timing chart of driving of a display panel according to Embodiment 1 and Embodiment 3 of the present invention.

Please refer to FIG. 3. FIG. 3 is a timing diagram of driving of a display panel according to an embodiment of the present invention. In the present embodiment, in order not to affect the normal display, the photoelectric signal position test is performed between the frame and the frame, that is, when the scanning signal and the data signal are at a low level. A first current detecting circuit located in the scan driver and a second current detecting circuit located in the data driver respectively detect current conditions on the respective photo sensors 4 through the scan lines and the data lines, if a current at a certain photo sensor 4 is significantly increased due to laser irradiation, the position information is fed back to the control module, and the sub-pixel change color is controlled by the control module to distinguish it from adjacent sub-pixels, thereby enabling the user to observe the projection position of the laser. In the present embodiment, the position of the laser irradiation can be displayed by increasing the brightness of the sub-pixel at the laser irradiation position.

The display panel of this embodiment has a plurality of photo sensors disposed on the thin film transistor array substrate. When the incident laser is irradiated onto the photo sensor, the photo sensor can be triggered to change the gray scale of the sub-pixel of the laser irradiation area, thereby determining the laser projection position and improving the demonstration effect.

Embodiment 2

Figure 5:
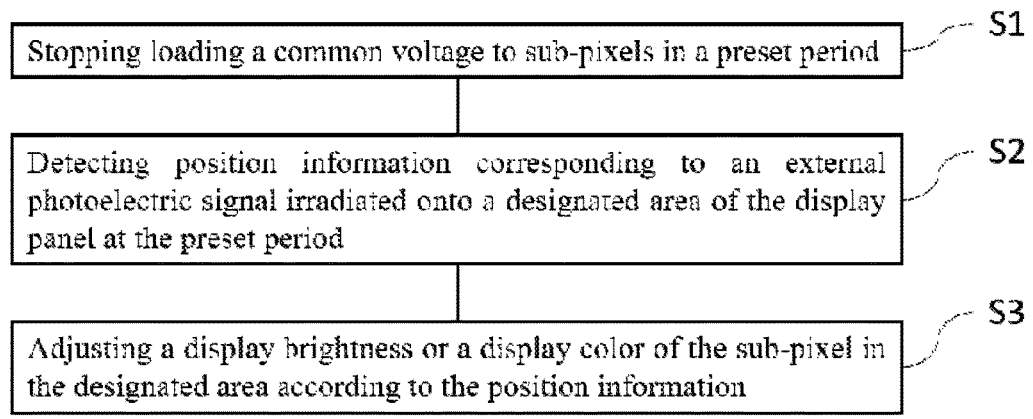
FIG. 5 is a flowchart of a display method according to Embodiment 2 and Embodiment 4 of the present invention.

Based on the foregoing Embodiment 1, the embodiment provides a display method. Referring to FIG. 5, FIG. 5 is a flowchart of a display method according to an embodiment of the present invention. The display method of this embodiment includes:

S1: Stopping loading the common voltage to the sub-pixels in the preset period.

Specifically, in this embodiment, the preset period is a period in which the scan signal and the data signal are both al low levels. That is, as described above, in order not to affect the normal display, the photoelectric signal position test is performed between the frame and the frame, that is, when the scanning signal and the control signal are both at low levels.

S2: Detecting position information corresponding to an external photoelectric signal that is irradiated onto a designated area of the display panel during the preset period.

Specifically, S2 includes:

S21: Receiving the external photoelectric signal and generating a feedback signal by a photo sensor located in the designated area.

S22: Determining position information corresponding to the external photoelectric signal according to the feedback signal.

S3: Adjusting a gray scale of the sub-pixel in the designated area according to the position information.

Determining whether a gray scale (or display brightness) of the specified area sub-pixel is smaller than a preset gray scale, if yes, increasing a gray scale of the designated area sub-pixel and its adjacent sub-pixels to improve display brightness of the designated area; if not, reducing the gray scale displayed by the designated area sub-pixel and its adjacent sub-pixels to reduce the display brightness of the designated area.

Specifically, it is determined whether the gray scale of the sub-pixel of the laser irradiation area is smaller than a preset gray scale value, if yes, the specified area sub-pixel and its adjacent sub-pixels are displayed with a gray scale 255; if not, the designated area sub-pixel and its adjacent sub-pixels are displayed with a gray scale of 0, so that the difference from other areas is displayed from the brightness to facilitate observation of the position of the laser irradiation.

During use of the display panel, when the display panel is in the normal display mode, the common voltage generated by the common voltage generating circuit is transmitted from the common voltage line 13 to the respective sub-pixels 11, so that the sub-pixel 11 is normally displayed. At this time, if the laser light from the external laser pen is irradiated onto one of the photo sensors 4 through the light transmissive passage 8, the intensity of the current flowing through the photo sensor 4 increases due to the action of the laser, and the display time between the frame and the frame is not displayed.

The display method of the embodiment performs the photoelectric signal position test between the frame and the frame, that is, when the scan signal and the data signal are at a low level, which can well determine the laser projection position, improve the demonstration effect, and at the same time ensure the normal display effect.

Embodiment 3

Figure 6:
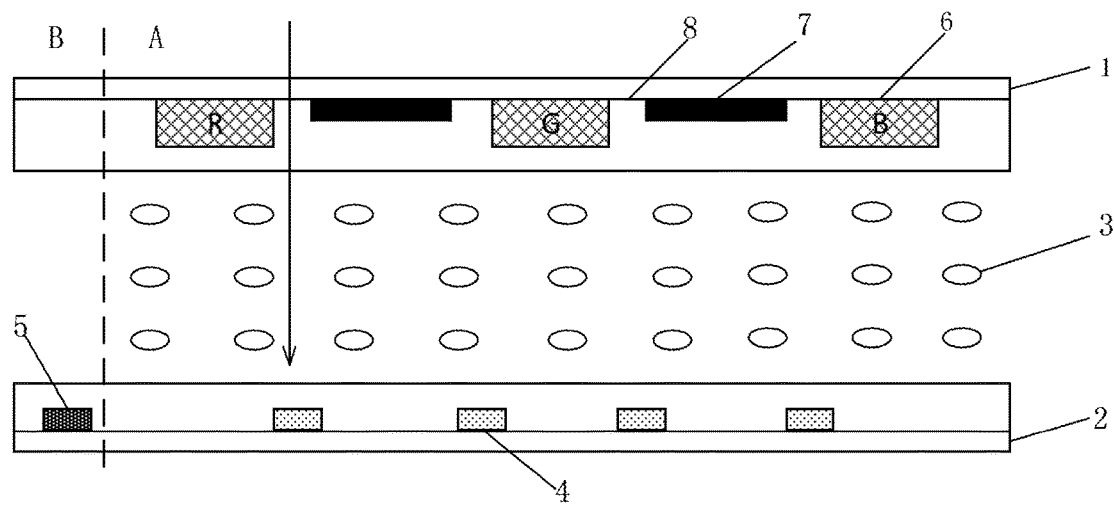
FIG. 6 is a schematic structural diagram of a display panel according to Embodiment 3 of the present invention.

Referring to FIG. 6, FIG. 6 is a schematic structural diagram of a display panel according to an embodiment of the present invention. As shown in FIG. 6, the display panel of the present embodiment includes a color filter substrate 1 and a thin film transistor array substrate 2 disposed opposite to each other, and a liquid crystal layer 3 is filled between the color filter substrate 1 and the thin film transistor array substrate 2. The thin film transistor array substrate 1 includes a display area A and a non-display area B, and the liquid crystal layer 3 is located in the display area A. Further, the thin film transistor array substrate 1 includes a display area A and a non-display area B, a plurality of photo sensors 4 are disposed in the display area A. and a plurality of control switches 5 are disposed in the non-display area B; a light transmissive passage 8 is formed at a position on the color filter substrate 2 that vertically corresponds to the photo sensor 4. A plurality of sub-pixels 11 are disposed on the thin film transistor array substrate 1 (see FIG. 7), the control switches 5 are configured to stop loading the common voltage to the sub-pixels 11 for a preset period, the photo sensor 4 is configured for detecting position information corresponding to the photoelectric signal when receiving the external photoelectric signal.

Further, the color filter substrate 2 includes a color filter 6 and a black matrix 7 which are arranged in phase. On the color filter substrate 2, the black matrix 7, and the color filter substrate 2 between the color filter 6 and the black matrix 7, a light transmitting hole 8 is formed at a position perpendicular to the photo sensor 4. As shown in FIG. 6, in this embodiment, the light transmissive passage 8 is formed on the color filter substrate 2 between the color filter 6 and the black matrix 7, and the photo sensor 4 is located on the thin film transistor array substrate 1 below the light transmissive passage 8. When the display panel is irradiated with laser light from the outside (as indicated by an arrow in FIG. 6), the laser light can be smoothly irradiated onto the photo sensor 4 through the light transmitting hole 8, thereby triggering a change in current on the photo sensor 4.

Figure 7:
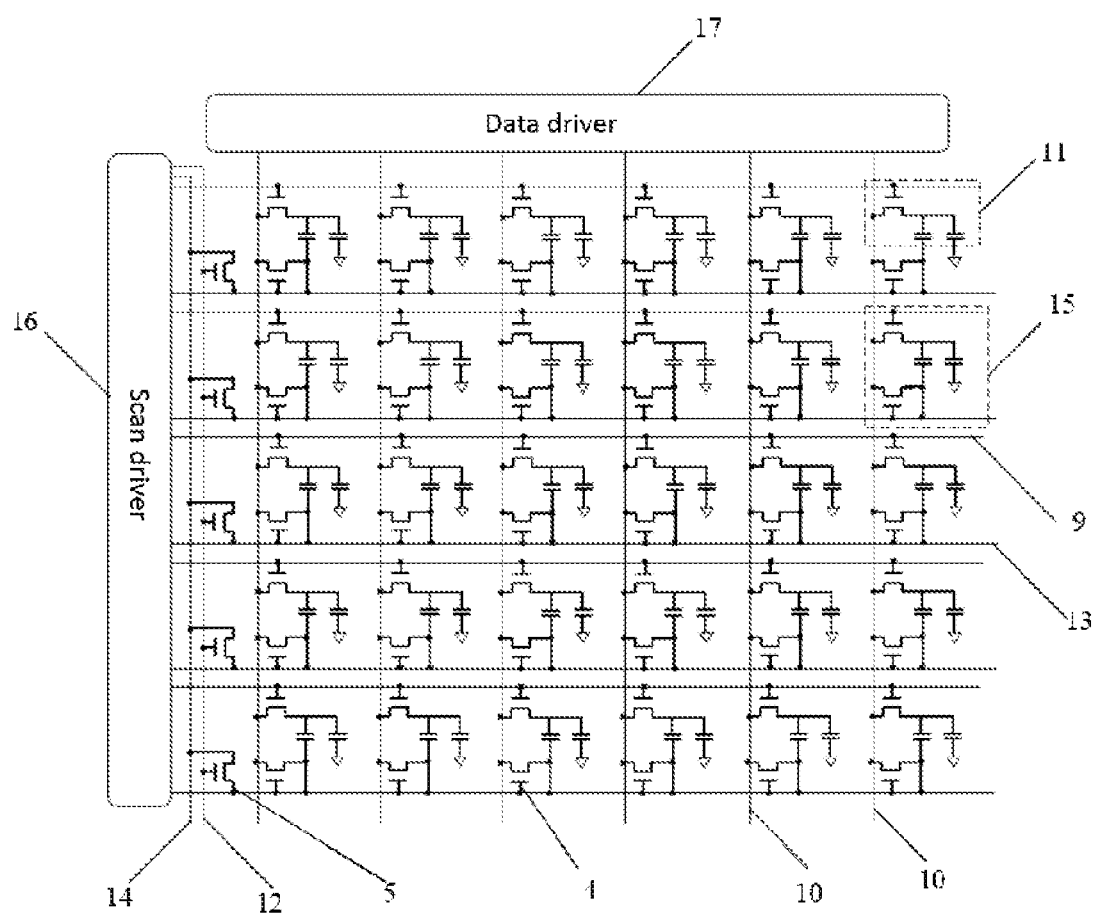
FIG. 7 is a structural diagram of an equivalent circuit of a display panel according to Embodiment 3 of the present invention.

Referring to FIG. 7, FIG. 7 is a structural diagram of an equivalent circuit of a display panel according to an embodiment of the present invention. As shown in FIG. 7, the thin film transistor array substrate 2 is provided with a plurality of scan lines 9 parallel to each other, a plurality of common voltage lines 13 parallel to the scan lines 9, a plurality of data lines 10 parallel to each other and perpendicular to the scan lines 9, a common voltage line 14 parallel to the data lines 10, and a plurality of sub-pixels 11 located at a region where the scan line 9 and the data line 10 intersect perpendicularly, the plurality of sub-pixels 11 are all located in the display area A.

In this embodiment, the plurality of scan lines 9 and the common voltage lines 13 are equal in number and arranged in parallel.

Specifically, the data line 10 is configured to load a data driving signal onto the sub-pixel 11, and the data driving signal controls the sub-pixel 11 to display colors of different gray scales according to the magnitude of the driving voltage, the scan line 9 is configured to load a scan driving signal to the sub-pixel 11, and the scan driving signal controls whether or not the data driving signal is loaded onto the sub-pixel 11. In one embodiment, the data line 10, the scan line 9 and the common voltage line 13 are generally made of a conductive material, and may be a metal element, an alloy, a metal oxide, a metal nitride, a metal oxynitride or a combination of two or more of the above materials.

With continued reference to FIG. 7, the photo sensor 4 is located in a region where the scan line 9 and the data line 10 intersect perpendicularly. In the present embodiment, the photo sensor 4 is a TFT element having a gate and a drain connected to a common voltage line 13 and a source connected to the data line 10.

Each of the sub-pixels 11 together with the scan line 9, the data line 10 and the common voltage line 13 form a pixel unit 15, each the pixel unit 15 is disposed with one of the photo sensors 4. Further, the thin film transistor array substrate 2 is further provided with a control signal line 12 connected to the control switch 5 configured to control the turning on and off of the control switch 5. In the present embodiment, the control switch 5 is a TFT element, the source is connected to the common voltage line 14, and the drain is connected to the common voltage line 13.

Figure 8:
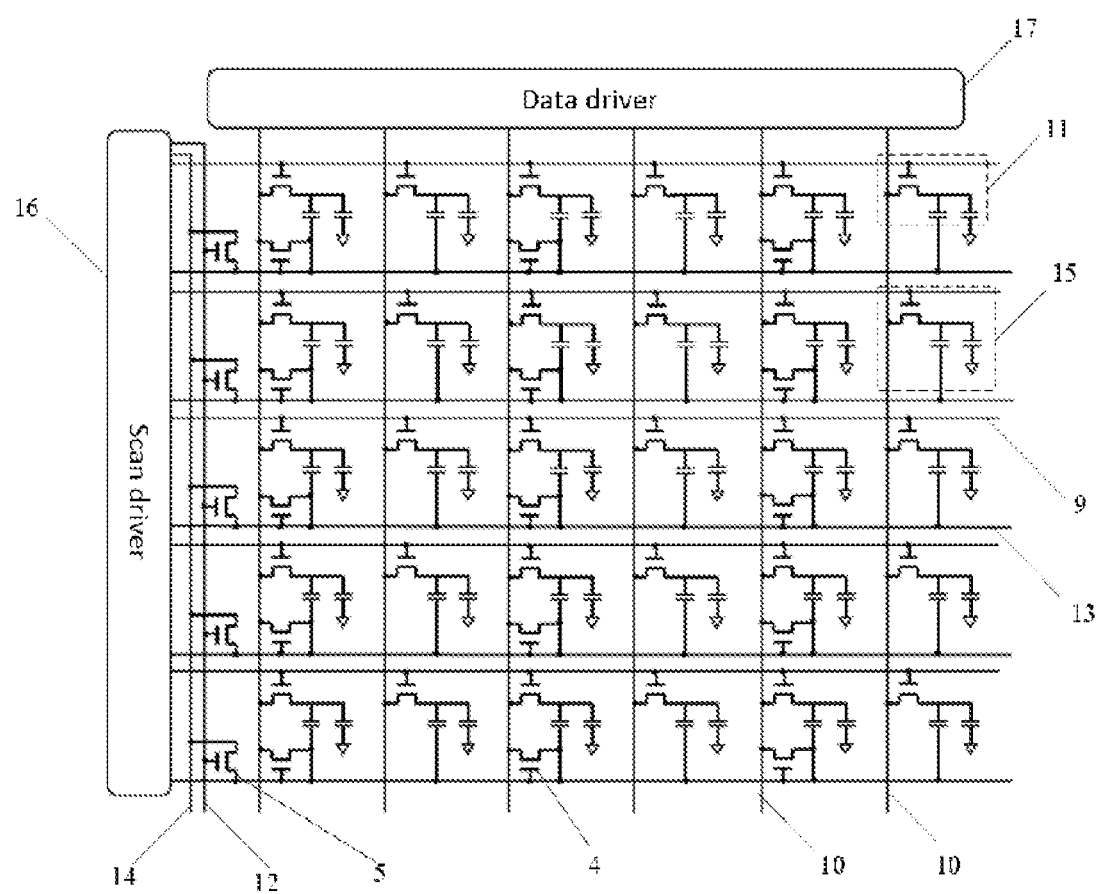
FIG. 8 is a schematic structural diagram of another display panel according to Embodiment 3 of the present invention.

However, it should be noted that in other embodiments, the photo sensor 4 may have other arrangements, and the photo sensor 4 may be set according to actual needs. Referring to FIG. 8, FIG. 8 is a schematic structural diagram of another display panel according to an embodiment of the present invention. In the display panel, not only one photo sensor 4 is connected to each of the sub-pixels 11, but the photo sensor 4 is provided on the sub-pixel 11 of the interleave column. In other embodiments, the display panel may be divided into a plurality of unit regions according to the diameter of the aperture of the incident light irradiated onto the panel, and one photo sensor 4 may be disposed on each of the unit regions or a plurality of photo sensors 4 may be uniformly disposed to increase the pixel aperture ratio.

Further, the display panel further includes a scan driver 16 and a data driver 17, the scan lines 9 are both connected to the scan driver 16 configured to supply scan voltages to the sub-pixels 11, and the data lines 10 are all connected to the data driver 17 configured to supply data voltages to the sub-pixels 11.

Further, a common voltage generating circuit (not shown) is integrated on the scan driver 16 for generating a common voltage. A common voltage line 13 is connected to the common voltage generating circuit to supply a common voltage to the sub-pixel 11, the photo sensor 4, and the control switch 5.

Further, the display panel further includes a first current detecting module (not shown) and a second current detecting module (not shown), the first current detecting module is connected to the photo sensors 4 through common voltage lines 13 for detecting current changes in the photo sensors 4 along a scan line direction; the second current detecting module is connected to the photo sensors 4 through the plurality of data lines 10 for detecting current changes in the photo sensors 4 along a data line direction.

Further, in the present embodiment, the first current detecting module is disposed on the scan driver 13, the first current detecting module is connected to the photo sensor 4 through a common voltage line 13 for detecting a change in current in the photo sensor 4 along the scan line direction, thereby detecting the position of the laser irradiation outside the scan line direction. The second current detecting module is disposed on the data driver 14, the second current detecting module is connected to the photo sensor 4 through the data line 10 for detecting a current change in the photo sensor 4 along the data line direction, thereby detecting the position of the laser irradiation outside the data line direction.

In this embodiment, the display device further includes a control module (not shown), the control module is coupled to the scan driver and the data driver configured to transmit control signals to the scan driver and the data driver to control the normal display time of each frame and the laser detection time between frames.

During use of the display panel, when the display panel is in the normal display mode, the control switch 5 is turned on. The common voltage generated by the common voltage generating circuit is transmitted from the common voltage line 14 through the control switch 5 to the corresponding common voltage line 13, and then transmitted to the respective sub-pixels 11 by the common voltage line 13, so that the sub-pixel 11 is normally displayed. At this time, if the laser light from the external laser pen is irradiated to one of the photo sensors 4 through the light transmissive passage 8, the intensity of the current flowing through the photo sensor 4 increases due to the action of the laser, and the control switch 5 is turned off within a preset time. The first current detecting module detects a current change on the common voltage line 13, the second current detecting module detects a current change on the data line 10, thereby determining a position of the laser irradiation, and feeding the position information to the control module. The control module sends a control signal, so that the brightness of the sub-pixel 11 and the adjacent sub-pixels at the position changes. For example, it becomes brighter or darker to make a difference in display with adjacent sub-pixels, so that the user can observe the position of the laser and complete the laser positioning action.

En this embodiment, the display change process of the sub-pixels of the laser irradiation area is: determining whether the gray scale of the sub-pixel of the laser irradiation area is smaller than a preset gray scale value, if yes, increasing the gray scale of the detection sub-pixel and its neighboring sub-pixels or pixels in the small area to improve the display brightness of the detection area to form a contrast between light and dark, for example, the specified area sub-pixel and its adjacent sub-pixels display a gray scale 255, that is, a white point appears here, if not, reducing the gray scale displayed by the pixels in the detection area sub-pixel and its adjacent sub-pixels or small areas to reduce the display brightness of the detection area to form a contrast between light and dark, for example, the specified area sub-pixel and its adjacent sub-pixels display gray scale 0, that is, a black dot appears here, so that the position of the laser irradiation is more easily found by the human eye. Alternatively, the detection area sub-pixels and their neighboring sub-pixels may be displayed in red, green or other colors, making it easier for the human eye to find the illumination position.

Further, in this embodiment, in order not to affect the display, the control switch 5 is disposed in the non-display area of the display panel, the gate of the control switch 5 is connected to the control signal line 12, the source is connected to the common voltage line 14, and the drain is connected to the common voltage line 13.

Please refer to FIG. 3 again. In this embodiment, in order not to affect the normal display, the photoelectric signal position test is performed between the frame and the frame, that is, when the scanning signal and the control signal are low level. As shown in FIG. 3, in the area between the frame and the frame, the control module transmits a control signal to the control switch 5 through the control signal line to switch the control switch 5 between the normal operation mode and the laser sensing mode. In the case of the normal operation mode, the control signal is in a high voltage state, the control switch 5 is turned on, and the common voltage is transmitted to the respective sub-pixels through the common voltage line 13; when the blank area of each frame is reached, the control signal is converted to a low voltage state, and the control switch 5 is turned off. At this time, the laser detection mode is entered, and the current detecting circuit detects the current condition of each photo sensor 4. If a current at a certain photo sensor 4 is significantly increased due to laser irradiation, the position information is fed back to the control module. The control module controls the sub-pixel variation brightness at that position to distinguish from adjacent sub-pixels, thereby enabling the user to observe the projected position of the laser. In the present embodiment, the position of the laser irradiation can be displayed by increasing the brightness of the sub-pixel at the laser irradiation position.

The display panel of the present invention has a plurality of photo sensors and a plurality of control switches disposed on the thin film transistor array substrate, when the incident laser is irradiated onto the photo sensor, the photo sensor can be triggered to determine the laser projection position to change the gray scale of the sub-pixel of the laser irradiation region, thereby improving the demonstration effect.

Embodiment 4

Based on the foregoing third embodiment, the embodiment provides a display method. Referring to FIG. 5 again, the display method of this embodiment includes:

S1: Stopping loading the common voltage to the sub-pixels in the preset period.

Specifically, in this embodiment, the preset period is a period in which the scan signal and the data signal are both at low levels. That is, as described above, in order not to affect the normal display, the photoelectric signal position test is performed between the frame and the frame, that is, when the scanning signal and the control signal are at a low level.

S2: Detecting position information corresponding to an external photoelectric signal that is irradiated onto a designated area of the display panel during the preset period.

Specifically, S2 includes:

S21: Receiving the external photoelectric signal and generating a feedback signal by a photo sensor located in the designated area.

S22: Determining position information corresponding to the external photoelectric signal according to the feedback signal.

S3: Adjusting a gray scale of the sub-pixel in the designated area according to the position information.

Determining whether a gray scale (i.e., display brightness) of the specified area sub-pixel is smaller than a preset gray scale, if yes, increasing a gray scale of the designated area sub-pixel and its adjacent sub-pixels to improve display brightness of the designated area; if not, reducing the gray scale displayed by the designated area sub-pixel and its adjacent sub-pixels to reduce the display brightness of the designated area.

Specifically, it is determined whether the gray scale of the sub-pixel of the laser irradiation area is smaller than a preset gray scale value, if yes, the designated area sub-pixel and its neighboring sub-pixels are displayed with a gray level 255; if not, the designated area sub-pixel and its neighboring sub-pixels are displayed with a gray scale of 0, so that the difference from other areas is displayed from the brightness to facilitate observation of the position of the laser irradiation. Alternatively, the detection area sub-pixels and their neighboring sub-pixels may be displayed in red, green or other colors, making it easier for the human eye to find the illumination position.

During use of the display panel, when the display panel is in the normal display mode, the control switch 5 is turned on, the common voltage generated by the common voltage generating circuit is transmitted from the common voltage line 14 through the control switch 5 to the corresponding common voltage line 13, and then transmitted to the respective sub-pixels 11 by the common voltage line 13, so that the sub-pixel 11 is normally displayed. At this time, if the laser light from the external laser pen is irradiated onto one of the photo sensors 4 through the light transmissive passage 8, the intensity of the current flowing through the photo sensor 4 increases due to the action of the laser light, the control switch 5 is turned off within a preset time, and the first current detecting module detects a change in current on the common voltage line 13, the second current detecting module detects a current change on the data line 10, thereby determining a position of the laser irradiation, and feeding the position information to the control module. The control module sends a control signal, so that the brightness of the sub-pixel 11 and the adjacent sub-pixels at the position changes, for example, it becomes brighter or darker to make a difference in display with adjacent sub-pixels, so that the user can observe the position of the laser and complete the laser positioning action.

The display method of the embodiment performs the photoelectric signal position test between the frame and the frame, that is, when the scanning signal and the control signal are at a low level, which can well determine the laser projection position, improve the demonstration effect, and at the same time ensure the normal display effect.

The above is a further detailed description of the present invention in connection with the specific preferred embodiments, and the specific embodiments of the present invention are not limited to the description. It will be apparent to those skilled in the art that the present invention may be made without departing from the spirit and scope of the invention.

What is claimed is:

1. A display panel, comprising a color filter substrate (1) and a thin film transistor array substrate (2) disposed oppositely, and a liquid crystal layer (3) filled between the color filter substrate (1) and the thin film transistor array substrate (2); wherein the thin film transistor array substrate (1) comprises a display area (A), a non-display area (B), and a plurality of photo sensors (4) are disposed in the display area (A);

the color filter substrate (2) is formed with a plurality of light transmissive passages (8);

the thin film transistor array substrate (1) is disposed with a plurality of sub-pixels (11); and the photo sensor (4) is configured for detecting position information corresponding to an external photoelectric signal when receiving the external photoelectric signal;

wherein the thin film transistor array substrate (2) is disposed with a plurality of scan lines (9), a plurality of data lines (10), and a plurality of common voltage lines (13);

wherein the display panel further comprises a scan driver (16) and a data driver (17); the plurality of scan lines (9) and the plurality of common voltage lines (13) are both connected to the scan driver (16), and the plurality of data lines (10) are connected to the data driver (17);

wherein the scan driver (16) is disposed with a first current detecting module, and the first current detecting module is connected to the photo sensors (4) through the plurality of scan lines (9) and configured for detecting current changes in the photo sensors (4) along a scan line direction.

2. The display panel according claim 1, wherein a number of the light transmissive passages (8) is equal to a number of the photo sensors (4), and each of the photo sensors (4) has one of the light transmissive passages (8) disposed there above.

3. The display panel according to claim 1, wherein
a number of the plurality of scan lines (9) and a number of the plurality of common voltage lines (13) are equal, the plurality of scan lines (9) are arranged in parallel and alternately with the plurality of common voltage lines.

4. The display panel according to claim 3, wherein the photo sensor (4) is a TFT element, a gate and a drain of the TFT element are connected to the scan line (9), and a source of the TFT element is connected to the data line (10).

5. The display panel according to claim 4, wherein the sub-pixel (11) is located in a region where the scan line (9) and the data line (10) intersect perpendicularly.

6. The display panel according to claim 5, wherein each of the sub-pixels (11) together with the scan line (9), the data line (10) and the common voltage line (13) form a pixel unit (15); and each the pixel unit (15) is disposed with one of the photo sensors (4).

7. The display panel according to claim 1, wherein the data driver (17) is disposed with a second current detecting module, and the second current detecting module is connected to the photo sensors (4) through the plurality of data lines (10) and configured for detecting current changes in the photo sensors (4) along a data line direction.

8. The display panel according to claim 1, wherein the non-display area (B) has a plurality of control switches (5) disposed therein, the control switches (5) are configured to stop loading a common voltage to the sub-pixels (11) in a preset period; the plurality of light transmissive passages (8) are located at positions vertically corresponding to the plurality of photo sensors (4) on the color filter substrate (2).

9. The display panel according to claim 8, wherein the thin film transistor array substrate (2) is provided with another common voltage line (14) and a control signal line (12),
a number of the plurality of scan lines (9) and a number of the plurality of common voltage lines (13) are equal, the plurality of scan lines (9) are arranged in parallel and alternately with the plurality of common voltage lines (13);
the control signal line (12) is connected to the control switches (5) and configured to control on and off states of the control switches (5).

10. The display panel according to claim 9, wherein the control switch (5) is a TFT element, a gate of the TFT element is connected to the control signal line (12), a source of the TFT element is connected to the another common voltage line (14), and a drain of the TFT element is connected to one of the plurality of common voltage lines (13).

11. The display panel according to claim 8, wherein on the thin film transistor array substrate (1), the photo sensor (4) is located in a region where the scan line (9) and the data line (10) intersect perpendicularly.

12. The display panel according to claim 11, wherein the photo sensor (4) is a TFT element, a gate and a drain of the TFT element are connected to one of the plurality of common voltage lines (13), and a source of the TFT element is connected to the data line (10).

13. The display panel according to claim 12, wherein each of the sub-pixels (11) together with the scan line (9), the data line (10) and one of the plurality of common voltage lines (13) form a pixel unit (15); and each of the pixel units (15) is disposed with one of the photo sensors (4).

14. A display method, comprising:
S1, stopping loading a common voltage to sub-pixels in a preset period;
S2, detecting position information corresponding to an external photoelectric signal irradiated onto a designated area of the display panel at the preset period; and
S3, adjusting a display brightness or a display color of the sub-pixel in the designated area according to the position information;
wherein the step S2 comprises:
S21, receiving the external photoelectric signal and generating a feedback signal by a photo sensor located in the designated area; and
S22, determining the position information corresponding to the external photoelectric signal according to the feedback signal;
wherein the step S22 comprises: detecting a current change in the photo sensor through a common voltage line by a first current detecting module and detecting a current change in the photo sensor through a data line by a second current detecting module, thereby determining the position information; or
wherein the step S22 comprises: detecting a current change in the photo sensor through a scan line by a first current detecting module and detecting a current change in the photo sensor through a data line by a second current detecting module, thereby determining the position information.

15. The display method according to claim 14, wherein the preset period is a period in which a scan signal and a data signal are both at low levels.

16. The display method according to claim 14, wherein the step S3 comprises:
determining whether a gray scale of the sub-pixel in the designated area is smaller than a preset gray scale, if yes, increasing the gray scale of the sub-pixel of the designated area and a gray scale of a neighboring sub-pixel so as to improve display brightness of the designated area; if not, reducing the gray scale of the sub-pixel of the designated area and a gray scale of a neighboring sub-pixel so as to reduce the display brightness of the designated area.

17. A display panel, comprising a color filter substrate (1) and a thin film transistor array substrate (2) disposed oppositely, and a liquid crystal layer (3) filled between the color filter substrate (1) and the thin film transistor array substrate (2); wherein
the thin film transistor array substrate (1) comprises a display area (A), a non-display area (B), and a plurality of photo sensors (4) are disposed in the display area (A);

the color filter substrate (2) is formed with a plurality of light transmissive passages (8);

the thin film transistor array substrate (1) is disposed with a plurality of sub-pixels (11); and the photo sensor (4) is configured for detecting position information corresponding to an external photoelectric signal when receiving the external photoelectric signal;

wherein the non-display area (B) has a plurality of control switches (5) disposed therein, the control switches (5) are configured to stop loading a common voltage to the sub-pixels (11) in a preset period; the plurality of light transmissive passages (8) are located at positions vertically corresponding to the plurality of photo sensors (4) on the color filter substrate (2);

wherein the thin film transistor array substrate (2) is disposed with a plurality of data lines (10) and a plurality of common voltage lines (13);

wherein the display panel further comprises a first current detecting module and a second current detecting module, wherein the first current detecting module is connected to the photo sensors (4) through the plurality of common voltage lines (13) and configured for detecting current changes in the photo sensors (4) along a scan line direction;

wherein the second current detecting module is connected to the photo sensors (4) through the plurality of data lines (10) and configured for detecting current changes in the photo sensors (4) along a data line direction.

* * * * *